United States Patent
Lee et al.

(10) Patent No.: US 8,333,505 B2
(45) Date of Patent: Dec. 18, 2012

(54) METHODS AND SYSTEMS FOR EXTENDING THE RANGE FOR FIBER OPTIC DISTRIBUTED TEMPERATURE (DTS) SYSTEMS

(75) Inventors: Chung Lee, Austin, TX (US); Kent Kalar, Sunset Valley, TX (US); Mahesh Ajgaonkar, Buda, TX (US); Michael Sanders, Austin, TX (US)

(73) Assignee: SensorTran, Inc., Austin, TX (US)

( * ) Notice: Subject to any disclaimer, the term of this patent is extended or adjusted under 35 U.S.C. 154(b) by 0 days.

(21) Appl. No.: 12/735,356

(22) PCT Filed: Jan. 17, 2009
(Under 37 CFR 1.47)

(86) PCT No.: PCT/US2009/000318
§ 371 (c)(1),
(2), (4) Date: Jul. 8, 2010

(87) PCT Pub. No.: WO2009/091600
PCT Pub. Date: Jul. 23, 2009

(65) Prior Publication Data
US 2011/0280277 A1    Nov. 17, 2011

Related U.S. Application Data

(60) Provisional application No. 61/022,225, filed on Jan. 18, 2008.

(51) Int. Cl.
*G01K 3/00* (2006.01)
(52) U.S. Cl. ........................................... 374/137
(58) Field of Classification Search ............... 374/137
See application file for complete search history.

(56) References Cited

U.S. PATENT DOCUMENTS

| | | | |
|---|---|---|---|
| 5,592,282 A * | 1/1997 | Hartog | 356/44 |
| 6,526,208 B1 | 2/2003 | King | |
| 6,542,228 B1 | 4/2003 | Hartog | |
| 7,284,903 B2 * | 10/2007 | Hartog | 374/130 |
| 7,304,725 B2 | 12/2007 | Hartog | |
| 7,369,219 B2 | 5/2008 | Rosolem | |
| 7,628,531 B2 * | 12/2009 | Lee et al. | 374/1 |
| 7,719,666 B2 * | 5/2010 | Kishida et al. | 356/73.1 |
| 8,005,323 B2 * | 8/2011 | Farhadiroushan et al. | 385/12 |
| 2006/0210269 A1 * | 9/2006 | Farhadiroushan et al. | 398/48 |
| 2006/0245468 A1 * | 11/2006 | Hartog | 374/161 |
| 2008/0068586 A1 * | 3/2008 | Kishida et al. | 356/32 |
| 2008/0316494 A1 | 12/2008 | Hartog | |
| 2011/0205620 A1 * | 8/2011 | Sugaya et al. | 359/337.1 |
| 2011/0228255 A1 * | 9/2011 | Li et al. | 356/33 |

* cited by examiner

*Primary Examiner* — Lisa Caputo
*Assistant Examiner* — Jamel Williams
(74) *Attorney, Agent, or Firm* — Michael A. Ervin; John W. Wustenberg

(57) ABSTRACT

Systems and methods for extending the range of a fiber optic DTS system are provided. In one respect, a method may provide steps for transmitting, in a first time period, an optical signal at a first energy level through an optical fiber, collecting backscatter signals as a result of the first transmission, adjusting the first energy level to a second energy level, transmitting, in an additional time period, the adjusted optical signal through the optical fiber, collecting backscatter signals as a result of the adjusted transmissions, and using a portion of the collected backscatter as a result of the first transmission and a portion of the collected backscatter as a result of the additional transmissions, determining one or more parameter profiles, such as a temperature profile.

3 Claims, 5 Drawing Sheets

METHODS AND SYSTEMS FOR EXTENDING THE RANGE FOR FIBER OPTIC DISTRIBUTED TEMPERATURE (DTS) SYSTEMS

CROSS REFERENCE TO RELATED APPLICATIONS

This application claims the benefit of U.S. provisional Ser. No. 61/022,225 filed Jan. 18, 2008.

BACKGROUND

This disclosure relates generally to distributed temperature sensing (DTS) systems and, more particularly, to methods and systems for extending the range of fiber optic DTS systems.

For several years, fiber optic sensors, and in particular, DTS systems, have provided higher bandwidth, inherently safe operation (no generation of electric sparks), and immunity from EMI (Electromagnetic Interference) for parameter measurements.

For example, the temperature profile parameter and other parameter profiles along the fiber can be monitored. The resulting distributed measurement is equivalent to deploying a plurality of conventional point sensors, which would require more equipment and increase operational costs. Each conventional electrical point sensor would require multiple electrical leads and this would add to a large and expensive cable bundle as the number of point sensors increase.

When an optical fiber is excited with a laser light having a center wavelength $\lambda$, most of the light is transmitted. However, small portions of incident light $\lambda$ and other excited components are scattered backward and forward along the fiber. The amplitude of the other excited components depends on the intensity of the light at center wavelength $\lambda$ and the properties of the optical fiber. In the measurement of distributed temperature using Raman scattering, three components are of particular interest. The three components are Rayleigh back-scattered light, which will have a similar wavelength $\lambda$ as the original laser wavelength, Raman Stokes and Raman anti-Stokes components which have longer and shorter wavelengths than the original wavelength $\lambda$. These three components can be separated by optical filters and received by photo detectors to convert light to electrical signals. A ratio between the temperature sensitive Raman anti-Stokes intensity to the temperature insensitive Rayleigh or largely temperature insensitive Raman Stokes intensity forms the basis of a Raman based distributed temperature measurement.

One problem with current systems and techniques is the ability to measure these parameter profiles over an extended distance, where the optical signal tends to degrade due to the attenuation along the fiber. In conventional fiber optic Raman based DTS systems, as an example, when the intensity of the input light is increased, the Raman Stokes and Raman anti-Stokes respective power in the optical fiber increases as well. This phenomenon is called Spontaneous Raman Scattering. When the input power of the optical source is further increased above a threshold level, stimulated scattering may occur either due to Brillouin scattering or Raman scattering. Stimulated Brillouin scattering manifests itself through the generation of a backward propagating Brillouin Stokes wave that carries most of the input energy once the Brillouin threshold is reached. The threshold level depends on light source properties such as peak power and spectral width, and optical fiber properties such as chemical composition of the fiber, Numerical Aperture and mode field diameter. Once the Brillouin threshold is reached, increased backward propagating non-linear stimulated Brillouin Stokes light may saturate the detector while limiting the amplitude of the forward propagating light. For these reasons, increasing the light energy by increasing the laser power is not a viable approach to increasing the distance reach for a conventional DTS system as the increase in signal energy is back scattered. Stimulated Brillouin scattering is often what limits the maximum power that can be transmitted into optical fibers using narrow line-width high power lasers.

Similarly, stimulated Raman scattering transfers energy in a non-linear fashion from the center light wavelength $\lambda$ to the Raman Stokes component. As a result, the ratio between Raman Stokes and Raman anti-Stokes varies without temperature changes, thus generating errors in temperature calculations. Data taken in the fiber length where non-linear stimulated interactions occur tends to generate significant errors in temperature calculations.

Hartog et al disclosed a scheme (U.S. Pat. No. 7,304,725) based on a sensing system composed of two sequential physically different fibers with different Numerical Apertures to avoid this effect. They also disclosed another system, in which an optical amplifier (more precisely a length of rare-earth doped fiber in a section of the sensing fiber) was placed in between two sensing fibers to boot up the attenuated input optic energy to reach further distance.

Such approaches introduce cost and complexity in both design and operation. Accordingly, systems and methods that provide for extending the range of fiber optic DTS systems without undue complexity in the sensing fiber design and deployment are desired.

BRIEF SUMMARY OF THE INVENTION

The method and apparatus described here to extend the range of fiber optic DTS systems is based on the active adjustment of energy level of the input light either by a variable optical attenuator or by directly varying laser power. This new scheme can be applied to any fiber sensing system while deploying a common and continuous sensing fiber throughout the length under measurement.

The scheme includes a method for extending the distance range of a fiber optic distributed temperature system using a single optical source including at least the steps of: transmitting, in a first time period, a first optical signal, at a first energy level and at a first wavelength through an optical fiber; collecting backscatter Raman Stokes and anti-Stokes signals as a result of said first transmission of said optical signal from a first length of the optical fiber; transmitting, in at least one additional time period, an additional optical signal at a higher energy level and at the first wavelength through said optical fiber; collecting backscatter Raman Stokes and anti-Stokes signals as a result of said additional transmission from an additional length of the optical fiber; wherein said backscatter Raman Stokes and anti-Stokes signals are those resulting from the spontaneous scattering of the additional optical signal at the first wavelength; using the collected Raman Stokes and anti-Stokes backscatter as a result of said first transmission to calculate a temperature profile of said first length of optical fiber and the collected Raman Stokes and anti-Stokes backscatter as a result of said additional transmissions to calculate a temperature profile of said additional length of optical fiber, and adding the temperature profiles to display a temperature response of the whole sensing fiber.

An aspect of this method is that the first transmission of the first optical signal corresponds to a first length of the optical fiber and the additional transmissions of additional optical signals correspond to additional lengths of the optical fiber.

An additional aspect of this method is that each additional energy level is greater than the energy level preceding it.

The scheme also includes a system for extending the distance range of a fiber optic distributed temperature system comprising: an optical source; an optical fiber; a variable optical attenuator; and a processor coupled to the variable optical attenuator, wherein the processor is configured to: adjust, in a first time period, the variable optical attenuator to result in a first transmission from the optical source through the optical fiber with a first optical energy level; collect backscatter signals corresponding to the first transmission; adjust, in at least one additional time period, the variable optical attenuator to result in an additional transmission from the optical source through the optical fiber with an additional optical energy level; collect backscatter signals corresponding to each additional transmission; and determine a parameter profile based at least on the collected backscatter signals corresponding to the first and additional transmissions.

BRIEF DESCRIPTION OF THE DRAWINGS

For a more complete understanding of the present disclosure, reference is now made to the following drawings, in which.

DETAILED DESCRIPTION OF THE INVENTION

In the following detailed description, reference is made to the accompanying drawings that illustrate embodiments of the present invention. These embodiments are described in sufficient detail to enable a person of ordinary skill in the art to practice the invention without undue experimentation. It should be understood, however, that the embodiments and examples described herein are given by way of illustration only, and not by way of limitation. Various substitutions, modifications, additions, and rearrangements may be made without departing from the spirit of the present invention. Therefore, the description that follows is not to be taken in a limited sense, and the scope of the present invention is defined only by the appended claims.

Figure 1:
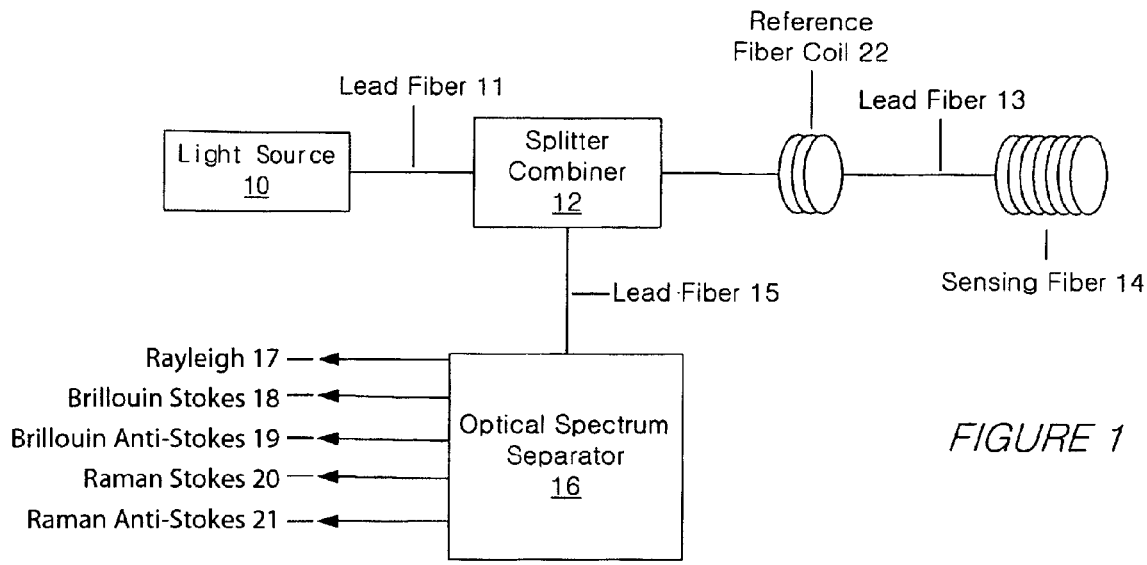
FIG. 1 is a block diagram of a conventional fiber optic DTS system.
Figure 2:
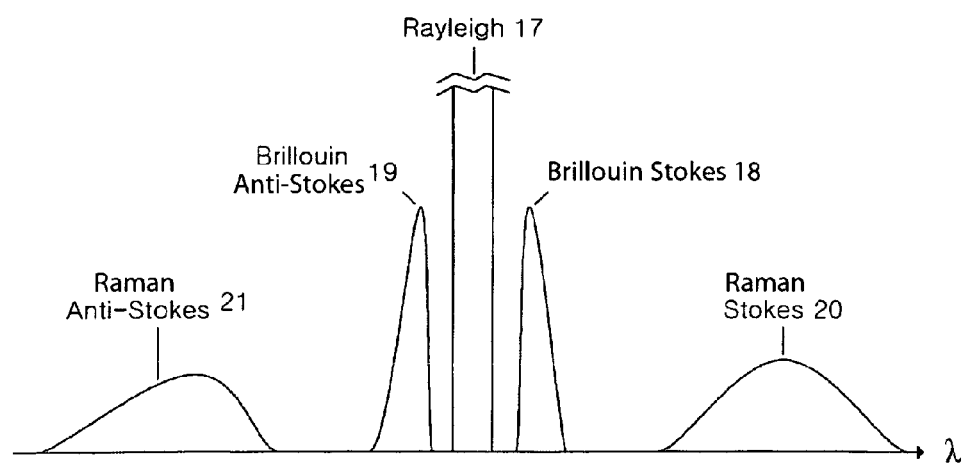
FIG. 2 is a graph of scattered signals.

FIG. 1 illustrates a conventional DTS system, including a light source 10, a lead fiber 11, a light splitter and combiner 12, lead fiber 13 and 15, a sensing fiber 14, optical spectrum separator 16, Rayleigh component 17, Brillouin Stokes component 18, Brillouin Anti-Stokes component 19, Raman Stokes component 20, and Raman Anti-Stokes 21 scattering and a reference fiber coil 22. Light source 10 provides optical signal through lead fiber 11 which may reach sensing fiber 14 via light splitter/combiner 12, reference fiber coil 22, and lead fiber 13. During the transmission of optical signal to sensing fiber 14, a portion of the light may be scattered and may travel back to optical spectrum separator 16 via lead fiber 15 and light splitter/combiner 12. The backscattered light from the sensing fiber may include light components such as Rayleigh component 17 (same center wavelength as injected light), Brillouin Stokes component 18 and Brillouin Anti-Stokes component 19, Raman Stokes component 20, and Raman Anti-Stokes component 21, which may be separated via optical spectrum separator 16. Raman Stokes 20 and Raman anti-Stokes 21 (collected Raman scatterings) may be shifted from the input wavelength of the optical signal and have mirror imaged about Rayleigh component 17, as shown in FIG. 2.

Reference fiber coil 22 of the DTS system may be used as a reference profile for the entire temperature profile of the sensing fiber. For other profiles, reference fiber coil 22 may be used as a reference point to compare or analyze measured points.

In one embodiment, the Raman components may be used to determine parameter profiles such as temperature profiles. The Raman Stokes and Raman Anti-Stokes band are typically separated by more than tens of nanometers, whereas Brillouin components 18 and 19 are much closer—less than 0.1 nanometer from the Rayleigh bandwidth, as shown in FIG. 2. In particular, the temperature may be inversely proportional to the intensity of Raman Stokes component 20 over the intensity of Raman Anti-Stokes component 21.

Due to the nature of the optical fiber, the transmitted light energy is decreased (or attenuated) as it travels through the fiber. As a result, the signal to noise ratio is lowered, which may cause a degradation of the temperature resolution towards the far end of the fiber. One way to solve this problem is to launch higher power laser light to increase the optical energy. However, as discussed earlier, this generates stimulated scattering and induces non-linearity, which degrades the accuracy and/or resolution of the DTS system.

Figure 3:
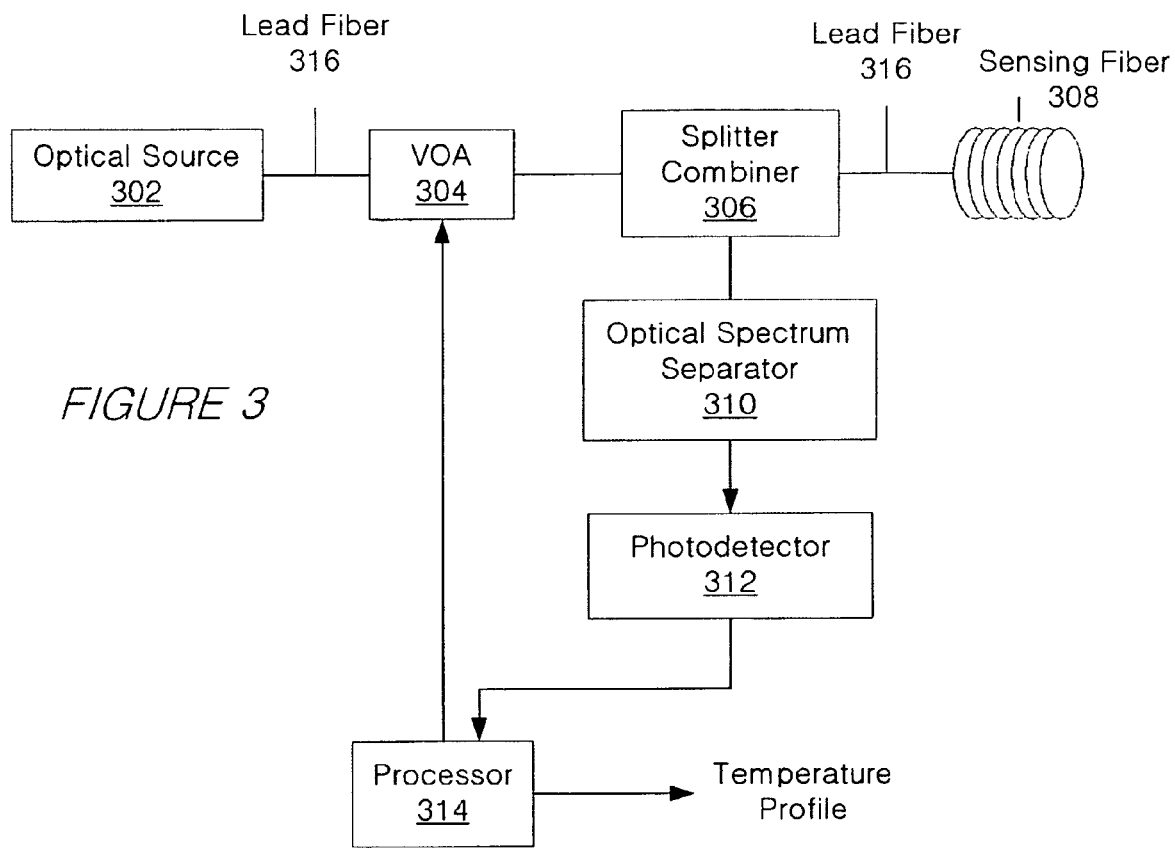
FIG. 3 is a block diagram of an extendible range fiber optic DTS system, in accordance with embodiments of the present disclosure.

FIG. 3 illustrates a block diagram of an extendible range fiber optic DTS system 300, which may provide an extension of temperature measurement range of sensing fibers without requiring additional optical or electrical amplifiers, and while minimizing or substantially eliminating non-linear effects, in accordance with embodiments of the disclosure. DTS system 300 may include optical source 302, a variable optical attenuator (VOA) 304, a splitter combiner 306, a sensing fiber 308, an optical spectrum separator 310, a photodetector 312, and a processor 314. The reference fiber coil is omitted in this figure.

Optical source 302 may be any electromagnetic radiation source configured to transmit an optical signal (e.g., light) through lead fiber 316, a variable optical attenuator (VOA) 304, splitter/combiner 306 to sensing fiber 308. In one embodiment, optical source 302 may be a 1064 nanometer or a 980-nanometer laser source. Other laser sources operating at different wavelengths may be used. Optical source 302 may generate a signal of constant energy, and the input energy level to lead fiber 316 may be controlled by VOA 304. VOA 304 may be any commercially available or custom designed variable optical attenuation device based on electro-optical, electro-mechanical, or acousto-optical working principles. VOA 304 may be used to adjust the output power level of optical source 302, which may extend the range (e.g., the distance) to detect, identify, and process various parameter profiles.

Splitter combiner 306 may be used to transmit the output of optical source 302 to sensing fiber 308. Any backscatter may be collected by splitter combiner 306 and forwarded to the optical spectrum separator 310, which filters the various relevant backscatter optical components (e.g., including the Rayleigh component, the Raman Stokes and Raman Anti-Stokes components). Photo detector 312, which may be a photodiode, may be used to detect the filtered backscattered components and to provide the detected components to processor 314.

Processor 314 may be any system or apparatus configured to process the information from the backscatter components and determine various parameter profiles, including for example, a temperature profile. For example, processor 314 may be any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, processor 314 may be a personal computer, a network storage device, a controller, or any other suitable device and may vary in size, shape, performance, functionality, and price. Processor 314 may include random access memory (RAM), one or more processing resources such as a central processing unit (CPU) or hardware or software control logic, ROM, and/or other types of nonvolatile memory. Additional components of processor 314 may include one or more disk drives, one or more network ports for communicating with external devices as well as various input and output (I/O) devices, such as a keyboard, a mouse, and/or a video display. Processor 314 may also include one or more buses operable to transmit communications between the various hardware components.

Referring to FIGS. 4A through 4D, timing diagrams for increasing the range to measure parameter profiles are shown, in accordance to embodiments of the present disclosure. In one embodiment, referring still to FIG. 4A, sensing fiber 308 may be divided into two equal parts, $L_{-l/2}$ and $L_{+l/2}$. It is noted though that sensing fiber 308 may be divided into multiple parts with equal or un-equal length portions, each of which may correspond to a time period and/or a particular power transmission.

Figure 4:
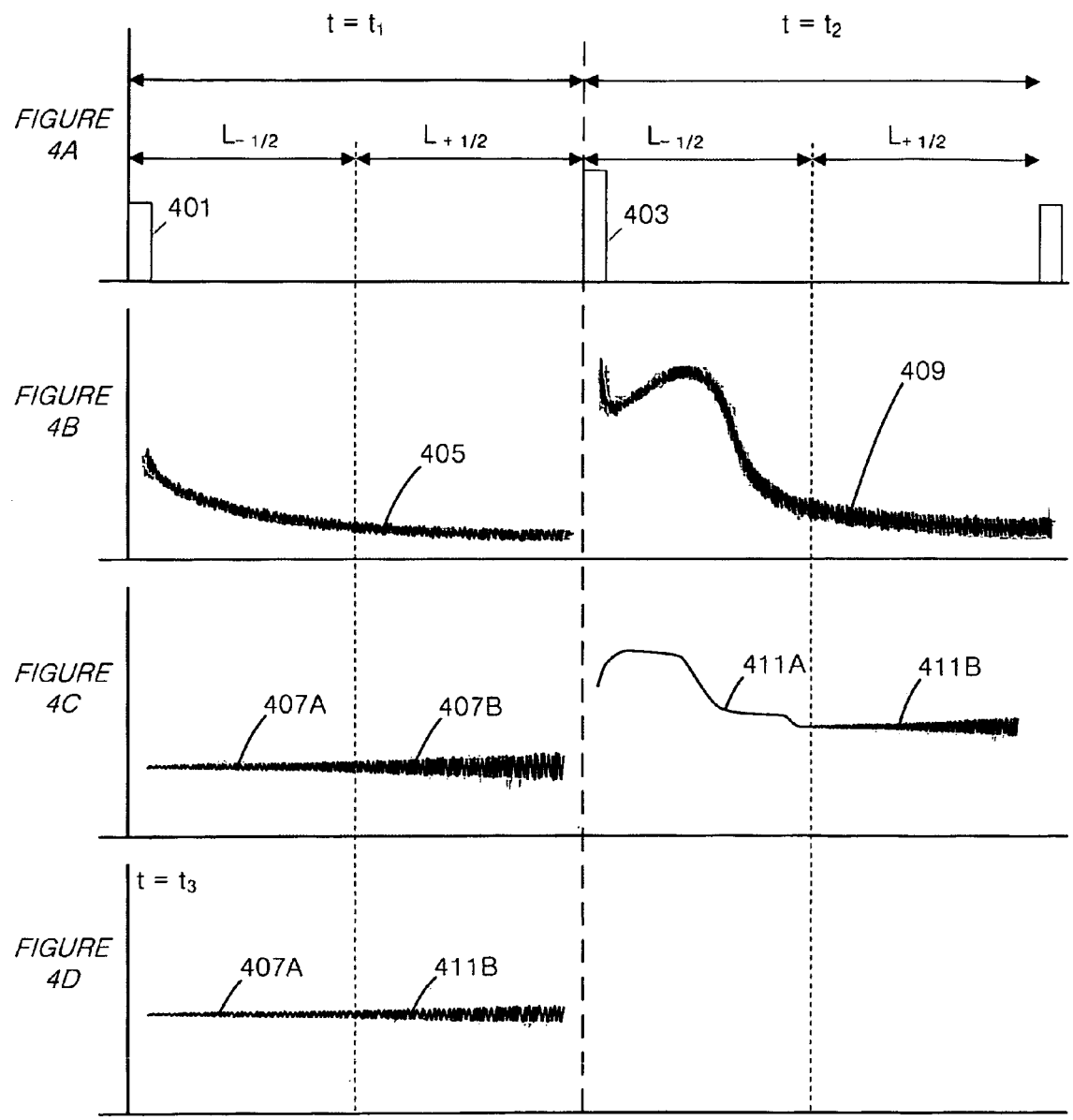
FIGS. 4A through 4D are timing diagrams, in accordance with embodiments of the present disclosure.

In one embodiment, parameter measurements may be performed over at least two time periods, $t_1$ and $t_2$, as shown in FIG. 4A. In the first time period $t_1$, VOA 304 may increase the level of attenuation applied, where an optical signal with a first power level 401 may be transmitted through lead 316. The optical power level is adjusted such that the scattering effect is maintained in the spontaneous regime in $L_{-l/2}$ thus yielding an accurate temperature measurement in fiber length $L_{-l/2}$. As the signal enters fiber length $L_{+l/2}$ the signal to noise ratio may have degraded and thus causing a degradation in the temperature resolution along fiber length $L_{+l/2}$. At the second time period $t_2$, VOA 304 may reduce the level of attenuation applied, which increases the power or energy level of the optical signal. The optical signal with the second power level 403, which may be greater than power level 401, and may be transmitted through lead fiber 316 to sensing fiber 308. The optical signal energy level may then be larger than the non-linear threshold for a part of the fiber length $L_{-l/2}$ but as the optical signal enters fiber length $L_{+l/2}$ the signal levels have attenuated such that the scattering effect is in the spontaneous regime. The optical signal to noise ratio in fiber length $L_{+l/2}$ is then much better than for measurement period $t_1$. By combining the temperature data from fiber length $L_{-l/2}$ in period $t_1$ with temperature data in fiber length $L_{+l/2}$ in period $t_2$, an extended Raman DTS can be achieved. The power levels and fiber sections may be selected such that the fiber sections have a portion of overlap where the signals are in the spontaneous regime for the different measurement periods. This would allow a portion of the e.g. fiber length $L_{-l/2}$ be the reference section for fiber length $L_{+l/2}$.

During time period $t=t_1$, the energy of the optical signal transmitted by optical source 302 through lead fiber 316 may be adjusted by VOA 304 to a first power level 401. Alternatively, the first power level may be the normal operating power of optical source 302, with no adjustments made. In the same or alternative embodiments, the power level may be adjusted directly at optical source 302.

FIG. 4B shows a corresponding Stokes band 405 that results from the transmission of the optical signal at the first power level 401. That band has a higher intensity in fiber length $L_{-l/2}$ than in fiber length $L_{+l/2}$ because the optical signal tends to degrade due to the attenuation along the fiber. Stokes band 405, along with other information may be used to determine a temperature profile such as the profile made up of 407A and 407B shown in FIG. 4C. Temperature profile 407B now exhibits a poorer resolution due to the inherent lower signal to noise ratio in fiber length $L_{+l/2}$. Processor 314 may use that total profile if it is acceptable or in an alternate embodiment may retain only temperature profile 407A that has the higher resolution.

In one embodiment, to obtain a better resolution profile for the distorted portion, the power level of optical source 302 may be adjusted. During the next period at $t=t_2$, the energy of the optical signal transmitted by optical source 302 through lead fiber 316 may be adjusted by VOA 304 to a second power or energy level 403, where second power or energy level 403 is higher than first power level 401. To implement this feature, the profile ratio or DAF (Differential Attenuation Factor) between Stokes and anti-Stokes distribution may be referenced to control VOA 304. In the same or alternative embodiments, optical source 302 may be adjusted to transmit at a second optical signal with a power level greater than power level 401. At the time of calibration for the DTS system, the measured DAF under spontaneous scattering (or lower energy mode) may be used as the reference of the energy level to the second half sensing length. The DAF of the second section of high-energy mode may be adjusted in similar range as the first section of the fiber of lower energy operation.

A Stokes band 409 associated with the transmission of an optical signal with second power level 403 may be used to determine the temperature profile. As shown in FIG. 4B, the energy of Stokes band 409 may grow in a non-linear fashion in the first section ($L_{-l/2}$) due to a stimulated scattering phenomenon. However, the signal energy is decreased in the second section of the fiber ($L_{+l/2}$) due in part to an attenuation factor, and part due to stimulated scattering in the first fiber section. The second fiber section then has the normal (or "spontaneous") scattering and normal temperature profile 411B, shown in FIG. 4C. In this case, processor 314 may retain a portion of the profile, namely 411B, and discard portion 411A.

The starting temperature of the second portion of sensing fiber 308 may be referenced by the calculated mean value of a portion of a first portion. Finally, the temperature profiles 407A and 411 B may be added sequentially in time sequence to display the temperature response of whole section of the sensing fiber as shown in FIG. 4D.

Figure 5:
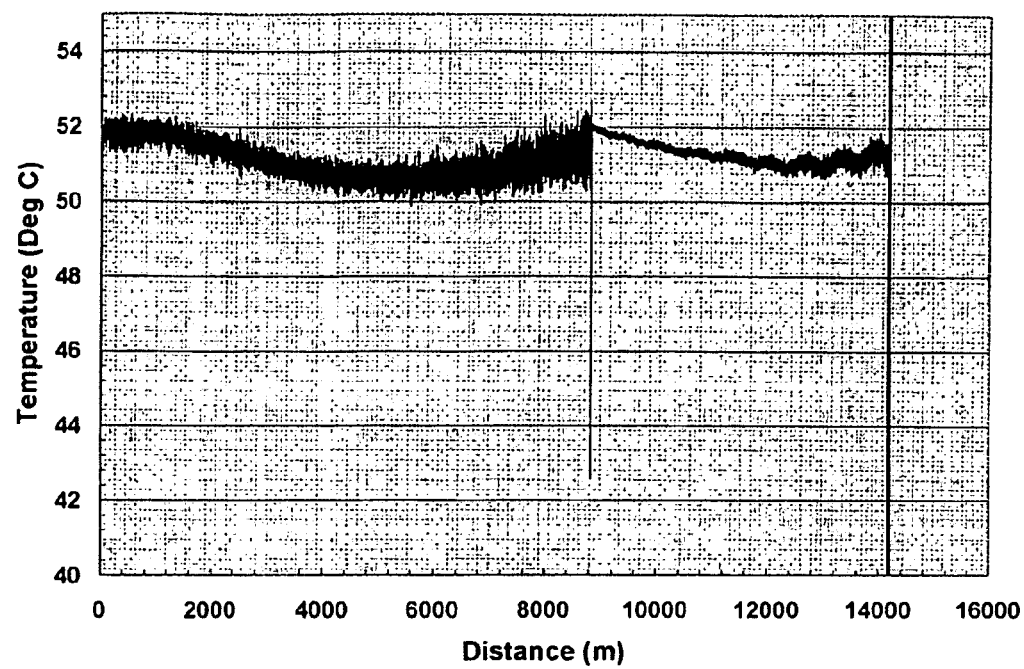
FIG. 5 is a graph of a temperature profile, in accordance with embodiments of the present disclosure.
Figure 6:
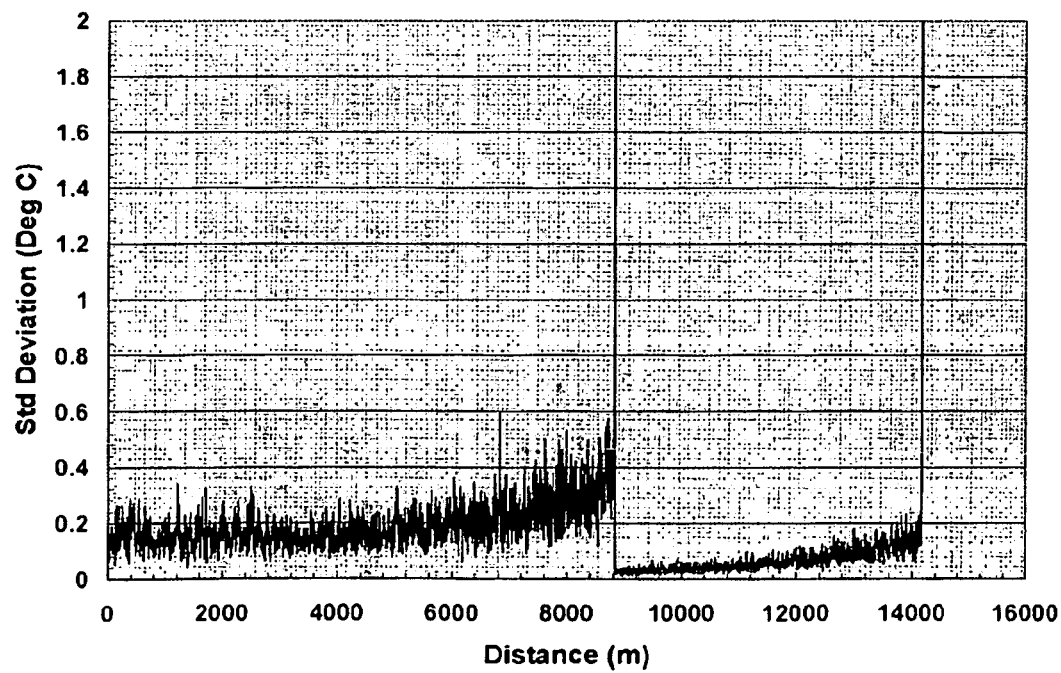
FIG. 6 is a graph of temperature resolution corresponding to the temperature profile of FIG. 5, in accordance with embodiments of the present disclosure.

FIGS. 5 and 6 show a graph of a temperature profile and its resolution obtained from an experimental result based on the embodiments of the present disclosure. Optical source 302 was a 1064 nanometer semiconductor laser, where a first power was about 300 µW for the first 9000 meters ($t=t_1$) in the fiber and subsequently adjusted to 1 mW for the next 5000 meters ($t=t_2$). It is noted that the power used may vary on at least the type of optical fibers (e.g., the characteristics of multimode fibers may vary from manufacturer to manufacturer).

FIG. 5 shows the resulting temperature resolution is within about +/−1° C. for the first 9000 meters. The temperature resolution for the following 5000 meters may be less than about +/−1° C. By increasing the energy level, as described in this disclosure, better results may be obtained in the second portion of the optical fiber. The temperature resolution indicated, using a twenty (20) point standard deviation is plotted in FIG. 6 for two minutes measurement time with one meter of spatial resolution.

Figure 7:
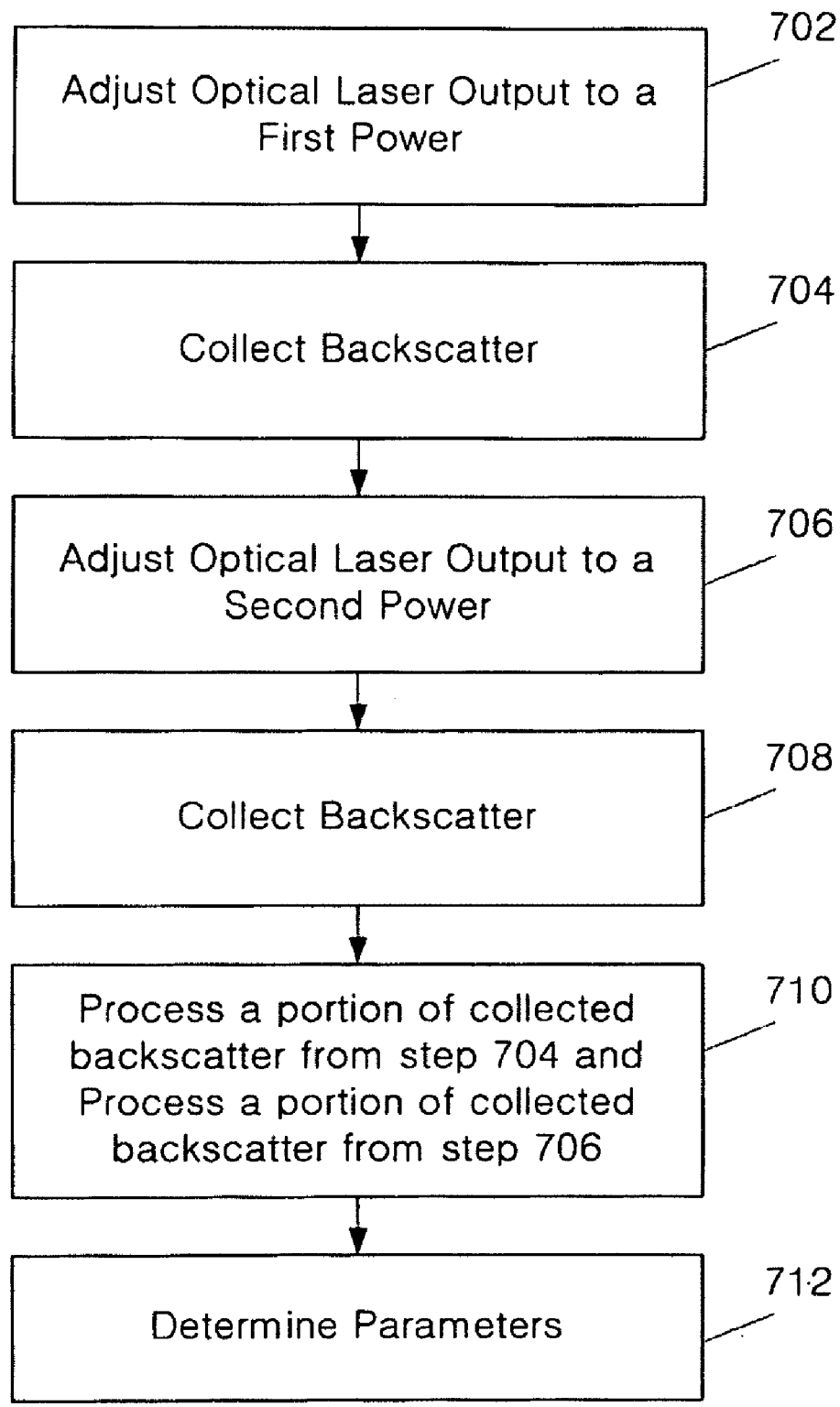
FIG. 7 is a flowchart of a method for extending the range for measuring parameter profiles, in accordance with embodiments of the present disclosure.

Turning now to FIG. 7, a flowchart of a method for extending a range of measurement, in accordance with embodiments of the present disclosure is shown. For clarity the flowchart is shown for two different laser power outputs, corresponding to two optical fiber lengths. In practice the method works for multiple times, optical signal power levels, and thus multiple optical fiber length segments. At step 702, the energy of the optical source may be adjusted to output a first optical signal with a first power or energy level through the optical fiber, where the first optical signal may be used to determine a temperature profile of a first length of the optical fiber. The transmission of the first optical signal may cause a spontaneous Raman scattering effect in both portions. At step 704, the corresponding Raman scattering components and Rayleigh component as a result of the first transmission, may be collected. In particular, some part of the temperature profile corresponding to a first portion of the optical fiber associated with the backscatter components may be retained.

At step 706, the optical source may be adjusted to output another optical signal with a second power level, where this additional optical signal may be used to determine a temperature profile of an additional portion of the optical fiber. In one embodiment, the second power level may be greater than the first power level. This adjustment of the optical signal strength may be done by adjusting a variable optical attenuator or it may be done by changing the operating condition of the optical source. At step 708, the corresponding Raman scattering as a result of the second transmission may be collected and a part of the corresponding temperature profile may be retained.

At step 710, the collected backscatter, and more particularly, the temperature profile corresponding to the collected backscatter from steps 704 and 708 may be processed. In one embodiment, the portions selected may be added together in time sequence and may be used to determine parameters, such as temperature, at step 712. The collected Stokes components can be used to identify the locations along the fiber where spontaneous and stimulated scattering occur. This information may be used to combine relevant sections of the temperature traces along the sensing fiber.

Some or all of the steps of the flowchart of FIG. 7 may be implemented using system 300 or any other system operable to implement the method. In certain embodiments, the method illustrated in FIG. 7 may be implemented partially or fully in software embodied in tangible computer readable media. As used in this disclosure, "tangible computer readable media" means any instrumentality, or aggregation of instrumentalities that may retain data and/or instructions for a period of time. Tangible computer readable media may include, without limitation, random access memory (RAM), read-only memory (ROM), electrically erasable programmable read-only memory (EEPROM), a PCMCIA card, flash memory, direct access storage (e.g., a hard disk drive or floppy disk), sequential access storage (e.g., a tape disk drive), compact disk, CD-ROM, DVD, and/or any suitable selection of volatile and/or non-volatile memory and/or a physical or virtual storage resource.

Although certain embodiments of the present invention and their advantages have been described herein in detail, it should be understood that various changes, substitutions and alterations can be made without departing from the spirit and scope of the invention as defined by the appended claims. Moreover, the scope of the present invention is not intended to be limited to the particular embodiments of the processes, machines, manufactures, means, methods, and steps described herein. As a person of ordinary skill in the art will readily appreciate from this disclosure, other processes, machines, manufactures, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufactures, means, methods, or steps.

We claim:

1. A method for extending the distance range of a fiber optic distributed temperature system using a single optical source comprising the steps of:
   a. transmitting, in a first time period, a first optical signal, at a first energy level and at a first wavelength through an optical fiber;
   b. collecting backscatter Raman Stokes and anti-Stokes signals as a result of said first transmission of said optical signal from a first length of the optical fiber;
   c. transmitting, in at least one additional time period, an additional optical signal at higher energy level and at the first wavelength through said optical fiber;
   d. collecting backscatter Raman Stokes and anti-Stokes signals as a result of said additional transmission from an additional length of the optical fiber; wherein said backscatter Raman Stokes and anti-Stokes signals are those resulting from the spontaneous scattering of the additional optical signal at the first wavelength;
   e. using the collected Raman Stokes and anti-Stokes backscatter as a result of said first transmission to calculate a temperature profile of said first length of optical fiber and the collected Raman Stokes and anti-Stokes backscatter as a result of said additional transmissions to calculate a temperature profile of said additional length of optical fiber, and adding the temperature profiles to display a temperature response of the whole sensing fiber.

2. The method for extending the distance range of a fiber optic distributed temperature system using a single optical source of claim 1, wherein transmitting an additional optical signal at a higher energy level comprises adjusting a variable optical attenuator.

3. The method for extending the distance range of a fiber optic distributed temperature system using a single optical source of claim 1, wherein transmitting an additional optical signal at a higher energy level comprises adjusting the optical source's transmitting energy by changing the operating condition of the optical source.

* * * * *